(12) United States Patent
Vaishnav et al.

(10) Patent No.: US 11,899,761 B2
(45) Date of Patent: *Feb. 13, 2024

(54) IDENTIFYING AND CONSENTING TO PERMISSIONS FOR WORKFLOW AND CODE EXECUTION

(71) Applicant: Microsoft Technology Licensing, LLC, Redmond, WA (US)

(72) Inventors: Sunay Vaishnav, Seattle, WA (US); Merwan Vishnu Hade, Seattle, WA (US); Stephen Christopher Siciliano, Bellevue, WA (US); David Nissimoff, Bellevue, WA (US); Fnu Anubhav, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,215

(22) Filed: May 26, 2022

(65) Prior Publication Data
US 2022/0292167 A1    Sep. 15, 2022

Related U.S. Application Data

(63) Continuation of application No. 15/976,868, filed on May 11, 2018, now Pat. No. 11,379,565.
(Continued)

(51) Int. Cl.
*G06F 21/31*    (2013.01)
*G06F 12/0891*    (2016.01)
(Continued)

(52) U.S. Cl.
CPC .......... *G06F 21/31* (2013.01); *G06F 12/0891* (2013.01); *G06F 21/51* (2013.01);
(Continued)

(58) Field of Classification Search
CPC .......... G06F 21/31; G06F 21/51; G06F 21/53; G06F 21/60; G06F 21/604;
(Continued)

(56) References Cited

U.S. PATENT DOCUMENTS

| 10,686,766 | B2 * | 6/2020 | Jahner | ............ H04L 63/10 |
| 2014/0137179 | A1 * | 5/2014 | Christodorescu | ....... H04L 63/10 726/1 |

(Continued)

*Primary Examiner* — Minh Dinh
(74) *Attorney, Agent, or Firm* — Weaver IP L.L.C.

(57) ABSTRACT

The present invention extends to methods, systems, and computer program products for identifying and consenting to permissions for workflow and code execution. Aspects of the invention can be used to automatically scan a workflow or code definition to identify (potentially all) the actions/triggers a workflow or program intends to perform on behalf of a user. The user is shown the actions/triggers the workflow or program intends to perform (e.g., at a user interface) before consent to perform the actions/triggers is granted. As such, a user is aware of intended actions/triggers of a workflow or program before granting consent. Further, since actions/triggers are identified from the workflow or code definition (and not formulated by an author), permission requests better align with permissions that workflow or program functionality actually uses during execution.

20 Claims, 8 Drawing Sheets

Related U.S. Application Data

(60) Provisional application No. 62/567,085, filed on Oct. 2, 2017.

(51) Int. Cl.
*G06F 21/53* (2013.01)
*G06F 21/60* (2013.01)
*G06F 21/51* (2013.01)

(52) U.S. Cl.
CPC ............ *G06F 21/53* (2013.01); *G06F 21/604* (2013.01); *G06F 2212/1052* (2013.01); *G06F 2221/2139* (2013.01)

(58) Field of Classification Search
CPC ......... G06F 2221/2139; G06F 12/0891; G06F 2212/1052
See application file for complete search history.

(56) References Cited

U.S. PATENT DOCUMENTS

| | | | | |
|---|---|---|---|---|
| 2015/0186664 A1* | 7/2015 | Nicolaou | .............. | G06F 21/554 726/30 |
| 2019/0005256 A1* | 1/2019 | Vaishnav | .............. | G06F 21/629 |

\* cited by examiner

```
{
  "name": "7e1ce1df-68ca-40b0-a272-4563c0ed894b",
  "id": "/providers/Corporation.ProcessSimple/environments/839eace6-59ab-4243-97ec-a5b8fcc104e4/flows/7e1ce1df-68ca-40b0-a272-4563c0ed894b",
  "type": "Corporation.ProcessSimple/environments/flows",
  "properties": {
    "apiId": "/providers/Corporation.PowerApps/apis/shared_logicflows",
    "displayName": "When a file is modified, complete a custom action",
    "userType": "Owner",
    "definition": {
      "$schema": "https://schema.management.project.com/providers/Corporation.Logic/schemas/2016-06-01/workflowdefinition.json#",
      "contentVersion": "1.0.0.0",
      "parameters": {
        "$connections": {
          "defaultValue": {},
          "type": "Object"
        },
        "$authentication": {
          "defaultValue": {},
          "type": "SecureObject"
        },
        "odb.folderPath": {
          "defaultValue": "",
          "type": "String"
        }
      },
      "triggers": {
        "When_a_file_is_modified": {
          "recurrence": {
            "interval": 1,
            "frequency": "Minute"
          },
          "type": "ApiConnection",
          "inputs": {
            "host": {
              "api": {
                "runtimeUrl": "https://firstrelease-001.project-apim.net/apim/driveforbusiness"
              },
              "connection": {
                "name": "@parameters('$connections')['shared_driveforbusiness']['connectionId']"
              }
            },
            "method": "get",
            "path": "/datasets/default/triggers/onupdatedfile",
            "queries": {
              "folderId": "@{'/ODBExperienceReview'}",
              "includeFileContent": true,
              "inferContentType": true
            },
            "authentication": "@parameters('$authentication')"
          }
        }
      },
      "actions": {
```

FIG. 4

```
412  "Send_an_email": {
        "runAfter": {},
        "type": "ApiConnection",
        "inputs": {
          "host": {
            "api": {
              "runtimeUrl": "https://firstrelease-001.project-apim.net/apim/shared"
            },
            "connection": {
              "name": "@parameters('$connections')['shared_app']['connectionId']"
            }
413     },
          "method": "post",
          "path": "/Mail",
          "body": {
            "To": "user@corp.com;",
            "Subject": "Changes made to @{triggerOutputs()['headers']['x-file-name']}",
            "Body": "@triggerOutputs()['headers']['x-file-path']"
          },
          "authentication": "@parameters('$authentication')"
        }
      }
    },
    "outputs": {}
  }
 }
}
```

FIG. 4
*(cont'd)*

IDENTIFYING AND CONSENTING TO PERMISSIONS FOR WORKFLOW AND CODE EXECUTION

CROSS-REFERENCE TO RELATED APPLICATIONS

This application is a continuation of U.S. application Ser. No. 15/976,868, filed on May 11, 2018, titled "IDENTIFYING AND CONSENTING TO PERMISSIONS FOR WORKFLOW AND CODE EXECUTION", now allowed, which claims the benefit of and priority to U.S. Provisional Patent Application No. 62/567,085, filed on Oct. 2, 2017, titled "IDENTIFYING AND CONSENTING TO PERMISSIONS FOR WORKFLOW AND CODE EXECUTION, each of which are incorporated by reference herein in their entireties.

BACKGROUND

1. Background and Relevant Art

Computer systems and related technology affect many aspects of society. Indeed, the computer system's ability to process information has transformed the way we live and work. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

Many applications perform actions on behalf of a user during execution. Frequently, these actions are designed to interact with user resources. However, interaction with user resources can require authorization based on user credentials. Thus, applications designed to interact with user resources have to request and receive user consent to access user credentials.

In some authentication environments, authors have to forward declare scopes/permissions for a workflow or application to perform actions on behalf of a user. In other environments, authors manually declare scopes/permissions for a workflow or application in a workflow or application manifest respectively. However, an author may not precisely know the actions to be performed. As such, a user may consent to permissions not used by a workflow or application creating a security risk.

When a workflow or application is shared with a user, the user is asked to provide credentials. The credentials can be included in a connection that can in turn be used to perform actions on behalf of the user. One problem faced by users is that they often do not know what a workflow or application intends to do with their connections until after consenting to permit a workflow or application to use their connections.

Another problem faced by users is that workflow or application authors may request permissions that exceed the scope of the permissions actually used by their workflows or applications. For example, an author may request permissions for features that are not included in a current version of a workflow or application but that might be added in future versions. A workflow or application author may request excessive permissions "just in case" so he or she does not have to subsequently request permissions from the user when additional features are added. However, requesting excessive permissions is a security risk since permissions granted to a workflow or application are not aligned with permissions used by the workflow or application.

It is also possible for an author to request excessive permissions for malicious purposes. For example, an author can request permissions unrelated to described functionality of a workflow or application. Since a user may not necessary know or understand a permissions request or a permissions request may be vague, the user may consent to the requested permissions. The author can then use the permissions to perform malicious activities through the workflow or application outside of the advertised functionality.

BRIEF SUMMARY

Examples extend to methods, systems, and computer program products for identifying and consenting to permissions for workflow and code execution. A machine code executable scanner scans a workflow definition and generates a permission summary from the workflow definition. The permission summary summarizes intended user credential usage by workflows instantiated from the workflow definition. The permission summary is presented at a user interface. A user can review the permission summary and consent to allow workflow usage of the user credential in view of the intended user credential usage. Consent data indicative of the user consent can be cached.

A user request to instantiate a workflow is received. The consent data is accessed based on an association between the permission summary and the user credential. The workflow is instantiated. A workflow activity defined in the permission summary is performed on a user resource using the user credential.

When a subsequent request to instantiate the workflow is received, the scanner (re)scans the workflow definition. If the permission summary remains the same, the workflow is instantiated and performs the workflow activity based on the cached consent data. If the permission summary differs, the consent data is evicted from cache and the permission summary presented at the user interface for new consent.

Similar mechanisms can be used with respect to scanning code definitions and providing consent for applications or programs instantiated from the code definition to use user credentials.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which:

FIG. 4 illustrates an example workflow definition.

DETAILED DESCRIPTION

Figure 1:
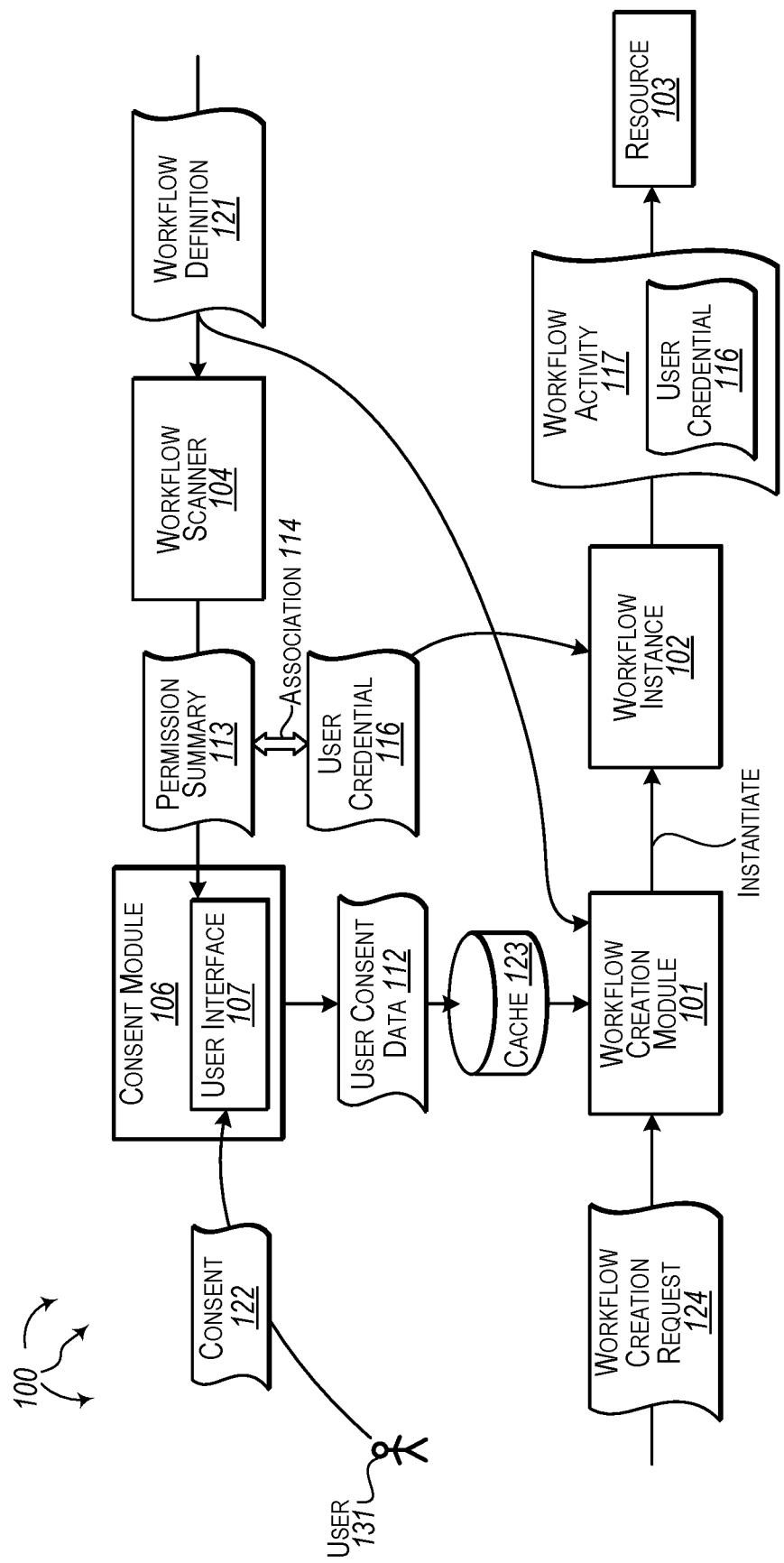
FIG. 1 illustrates an example computer architecture that facilitates identifying and consenting to permissions for workflow and code execution.

Examples extend to methods, systems, and computer program products for identifying and consenting to permissions for workflow and code execution. A machine code executable scanner scans a workflow definition and generates a permission summary from the workflow definition. The permission summary summarizes intended user credential usage by workflows instantiated from the workflow definition. The permission summary is presented at a user interface. A user can review the permission summary and consent to allow workflow usage of the user credential in view of the intended user credential usage. Consent data indicative of the user consent can be cached.

A user request to instantiate a workflow is received. The consent data is accessed based on an association between the permission summary and the user credential. The workflow is instantiated. A workflow activity defined in the permission summary is performed on a user resource using the user credential.

When a subsequent request to initiate the workflow is received, the scanner (re)scans the workflow definition. If the permission summary remains the same, the workflow is instantiated and performs the workflow activity based on the cached consent data. If the permission summary differs, the consent data is evicted from cache and the permission summary presented at the user interface for new consent.

Similar mechanisms can be used with respect to scanning code definitions and providing consent for applications or programs instantiated from the code definition to use user credentials. For example, a machine code executable scanner scans a code definition and generates a permission summary from the code definition. The permission summary summarizes intended user credential usage by executable programs instantiated from the code definition. The permission summary is presented at a user interface. A user can review the permission summary and consent to allow program usage of the user credential in view of the intended user credential usage. Consent data indicative of the user consent can be cached.

A user request to instantiate a program is received. The consent data is accessed based on an association between the permission summary and the user credential. The program is instantiated. A program activity defined in the permission summary is performed on a user resource using the user credential.

When a subsequent request to instantiate the program is received, the scanner (re)scans the code definition. If the permission summary remains the same, the program is instantiated and performs the program activity based on the cached consent data. If the permission summary differs, the consent data is evicted from cache and the permission summary presented at the user interface for new consent.

Workflow designers and application designers are tools that can be used to build and share workflows and applications respectively. Workflows and applications can be built using actions/triggers exposed by connectors. A connector is a thin interface that allows workflows and applications to interact with $1^{st}$ and $3^{rd}$ party applications. A connection is a child resource of a connector. A connection holds credentials or secrets that grant access to underlying resources accessed via parent connectors.

Aspects of the invention can be used to automatically scan a workflow or code definition to identify (potentially all) the actions/triggers the workflow or program/application intends to perform on behalf of a user. The user is shown the actions/triggers the workflow or program/application intends to perform (e.g., at a user interface) before consent to perform the actions/triggers is granted. As such, a user is aware of intended actions/triggers of a workflow or program/application before granting consent. Further, since actions/triggers are identified from the workflow or code definition (and not formulated by an author), permission requests are better aligned with permissions that workflow or application functionality is to use during execution.

Accordingly, (potentially all) permissions can be determined for a workflow or program authoritatively and accurately ahead of execution time. As such, permissions can be checked before runtime, providing a performance improvement at runtime by front-loading permission checks before execution. Checking permissions before runtime provides a more secure execution environment since a user is apprised of more accurate and detailed permissions information before a workflow or application is run. Checking permissions before runtime also significantly reduces (if not totally eliminates) additional runtime permission checks providing a performance improvement.

In one aspect, the definition for a workflow or application can be scanned to automatically identify what actions from a connector are being used within the workflow or application. The identified actions can be extracted from the workflow or application definition and defined in a manifest (i.e., a summary file) for the workflow or application. The identified actions can be defined with a relatively high level of precision.

Per action/trigger, the manifest can define both a resource (e.g., a camera, a directory, inbox, etc.) to be accessed and operations (e.g., read, read and write, etc.) to be performed on the accessed resource. The higher level of precision can be used to provide a user with more precise representation of a workflow or application intent. Accordingly, a user can examine what permissions workflows or applications intend to use before granting consent (and do not have to rely on the trustworthiness of a workflow, code, or author).

Actions/triggers can be identified and extracted from a workflow definition or an application definition automatically and intelligently. As such, workflow and application authors are also relieved (and may be expressly prevented) from forward declaring and/or manually setting permissions.

In one aspect, each workflow or application includes a definition that describes what the workflow or application does. The definition is machine readable and can be parsed automatically to catalog (e.g., in a manifest) what actions from a connector are to be used in the workflow or application. From the cataloged actions, actions using user credentials are identified. A human readable title and description for each action using user credentials can be fetched from the manifest for each connector. The title and description are made available to the user before he or she consents to run a workflow or application.

Consent data indicating user consent can be cached. When instantiation of a workflow or program is requested, a workflow or code definition is (re)scanned and a permission summary generated. If the permission summary remains the same, the workflow or program is instantiated and can performs workflow or program activities based on the cached consent data. If the permission summary differs (indicating changes to the workflow or code definition), the consent data is evicted from cache and the permission summary presented at the user interface for new consent.

Implementations may comprise or utilize a special purpose or general-purpose computer including computer hardware, such as, for example, one or more computer and/or hardware processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: workflow definitions, workflows, code definitions, programs, permission summaries, consent, user credentials, user consent data, workflow creation requests, program creation requests, connections, triggers, actions, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, workflow definitions, workflows, code definitions, programs, permission summaries, consent, user credentials, user consent data, workflow creation requests, program creation requests, connections, triggers, actions, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, "instantiating" is defined as creating an instance of an object from a definition for the object. Instantiating includes creating an instance of a workflow (or "workflow instance") from a workflow definition Instantiating also includes creating an instance of specified functionality defined in a workflow template within a workflow instance created from the workflow template. Instantiating includes creating an instance of a program (or "program instance") from a code definition.

FIG. 1 illustrates an example computer architecture 100 that facilitates identifying and consenting to permissions for workflow and code execution. As depicted, computer architecture 100 includes workflow creation module 101, resource 103, workflow scanner 104, consent module 106, and cache 123. Workflow creation module 101, resource 103, workflow scanner 104, consent module 106, and cache 123 can be connected to (or be part of) a network, such as, for example, a system bus, a Local Area Network ("LAN"), a Wide Area Network ("WAN"), and even the Internet. Accordingly, workflow creation module 101, resource 103, workflow scanner 104, consent module 106, and cache 123 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Generally, workflow creation module 101 is configured to instantiate workflow instances from workflow definitions.

Workflow scanner 104 is configured to scan a workflow definition and generate a permissions summary for the workflow definition. The permission summary can explain what a workflow does, including what and how user resources are to be accessed. Workflow scanner 104 can send a permission summary to consent module 106.

In one aspect, workflow scanner 104 is an executable program in the form of machine code. The executable program is executed to run the machine code on a processor. Running the machine code scans a workflow definition and generates a corresponding permission summary. As such, permission summaries generated by workflow scanner 104 can be considered "machine code generated" permission summaries.

Consent module 106 is configured to present a permission summary at user interface 107 to request user consent for a workflow to access user credentials. A user can view the permission summary at user interface 107 and decide to permit or deny access to their user credentials. When consent is provided, workflows instantiated from the workflow definition are permitted to access the user credentials to perform workflow activities. User consent data can also be cached in cache 123.

When a subsequent request to instantiate the workflow is received, workflow scanner 104 (re)scans the workflow definition and generates another permission summary. If the new permission summary is essentially the same as the permission summary, the workflow is instantiated and performs a program activity based on the cached consent data. If the new permission summary differs, the user consent data is evicted from cache 123 and the new permission summary is presented at user interface 107 for new consent.

Workflow scanner 104 can scan workflow definition 121 and generate permission summary 113. Generating permission summary 113 can include identifying and extracting actions/triggers (e.g., workflow activity 117) a workflow (e.g., workflow instance 102) intends to perform. The actions/triggers (e.g., workflow activity 117) can be defined in permission summary 113. Workflow scanner 104 can present permission summary 113 at user interface 107. As such, user 131 is shown the actions/triggers the workflow (e.g., workflow instance 102) intends to perform before consent to perform the actions/triggers and use user credential 116 is granted.

User 131 can view permission summary 113 at user interface 107. User 131 can input consent 122 to consent to actions/triggers of the workflow (e.g., workflow 102) indicated in permission summary 113 using user credential 116. As such, association 114 is established between permission summary 113 and user credential 116. Consent module 107 can formulate user consent data 112 indicative of association 114. Consent module 107 can store user consent data 112 in cache 123.

Figure 2:
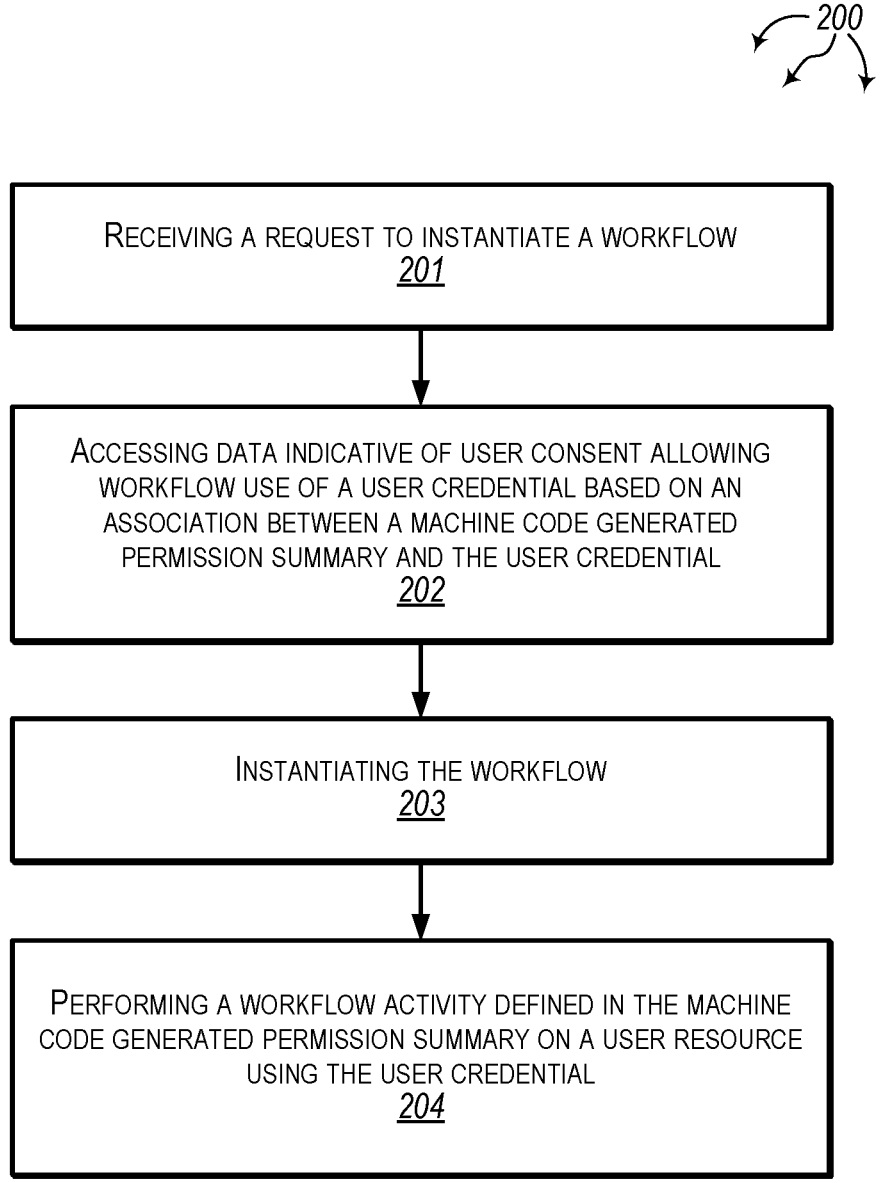
FIG. 2 illustrates a flow chart of an example method for identifying and consenting to permissions for workflow and code execution.

FIG. 2 illustrates a flow chart of an example method 200 for identifying and consenting to permissions for workflow and code execution. Method 200 will be described with respect to the components and data in computer architecture 100.

Method 200 includes receiving a request to instantiate a workflow (201). For example, workflow creation module 101 can receive workflow creation request 124. Workflow creation request 124 can be sent from user 131, for example, via a computer system or other electronic device, associated with user 131. Workflow creation request 124 can be a request to instantiate a workflow from workflow definition 121.

Method 200 includes accessing data indicative of user consent allowing workflow use of a user credential based on an association between a machine code generated permission summary and the user credential (202). For example, workflow creation module 101 can access user consent data 112 from cache 123. User consent data 112 indicates user 131's consent to allow workflows instantiated from workflow definition 121 to use user credential 116 (based on association 114).

Method 200 includes instantiating the workflow (203). For example, workflow creation module 101 can instantiate workflow instance 102 from workflow definition 121. Method 200 includes performing a workflow activity defined in the machine code generated permission summary on a user resource using the user credential (204). For example, workflow instance 102 can perform workflow activity 117 on resource 103 using user credential 116.

User consent data 112 can remain stored in cache 123 unless/until workflow definition 121 changes. If workflow definition 121 changes, workflow scanner 104 can (re)scan workflow definition 121 and generate a new permission summary. Workflow scanner 104 can determine that the new permission summary differs from permission summary 113. In response, workflow scanner 104 evicts user consent data 112 from cache 123 and sends the new permission summary to consent module 106. User 131 can view the new permission summary at user interface 107 and decide whether or not to consent to any new intended uses of user credential 116. If user 113 gives consent, new user consent data is stored in cache 123.

Aspects described with respect to computer architecture 100 and method 200 are equally applicable to programs or applications instantiated from a code definition. A scanner can scan a code definition and generate a permissions summary. The permissions summary indicates intended user credential usage by programs/applications instantiated from the code definition. The scanner can present the permission summary at a user interface of a consent module and a user can decide whether or not to consent to intended usage of a user credential.

Figure 3:
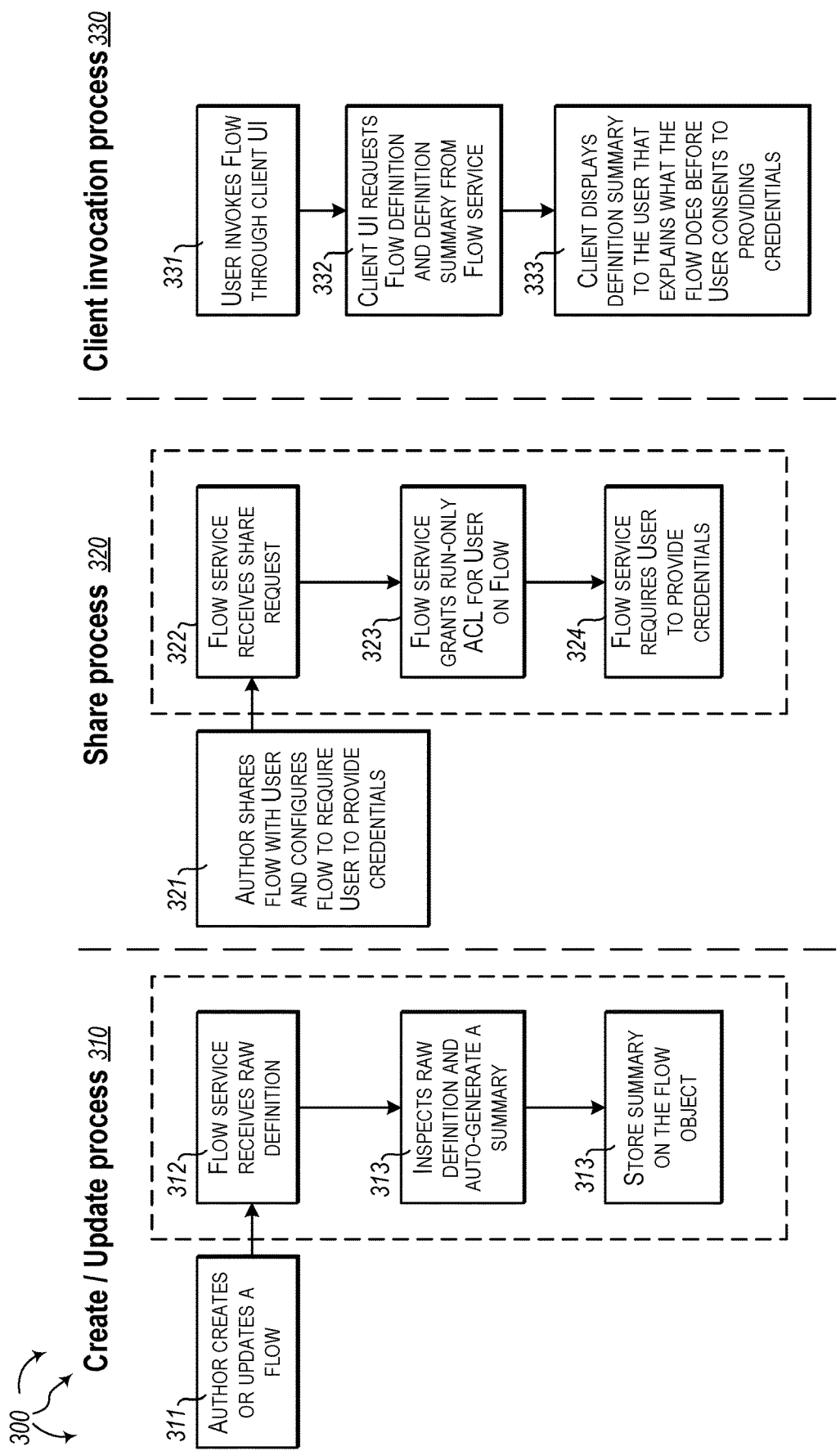
FIG. 3 illustrates a flow chart of an example method for creating/updating a workflow, sharing a workflow, and invoking a workflow.

FIG. 3 illustrates an example flow chart of a method for creating/updating a workflow 310, sharing a workflow 320, and invoking a workflow 330.

An author can create or update a workflow using a workflow designer (311). A workflow can be represented by a workflow definition defining in accordance with a workflow definition schema. In one aspect, a workflow definition is represented as a JavaScript Object Notation (JSON) file. The workflow definition can be sent to a flow service. The flow service can receive the raw workflow definition (312).

FIG. 4 depicts an example workflow definition 400. Workflow definition 400 includes trigger definitions 401, including a trigger for file modification 402. A connection.name, path, and method for the file modification trigger are defined in code portion 403. Workflow definition 400 also includes action definitions 411, including an action for sending an email 412. A connection.name, path, and method for the send email action are defined in code portion 413.

The flow service can inspect the raw workflow definition and auto-generate a summary (manifest) (313). The flow service can parse the workflow definition and identify trigger and actions being used. For each trigger and action, the flow service can locate a separate description file by looking at the connection.name property under each trigger or action. The flow service can get the original trigger or action title and description from the separate description file. The original title and description can be identified by matching the path and method property on each trigger or action. The flow service can generate the summary (manifest) by consolidating metadata for each trigger and action fetched from one or more separate description files.

Figure 5:
FIG. 5 illustrates an example workflow definition summary.

FIG. 5 depicts an example workflow definition summary 500. Section 501 includes title and description for triggers, including title and description 502 for trigger 402 (i.e., when a file is modified). Section 511 includes title and description for actions, including title and description 512 for action 412 (i.e., send an email). Title and description 502 can be accessed from a description file identified by a connection.name in code portion 403. Title and description 512 can be accessed from a description file identified by a connection.name in code portion 513.

Referring back to FIG. 3, an author can use share process 320 to share a workflow with a user. An author can share a flow with a user and configure the flow to request credentials from the user (321). The flow service can receive the share request (322). The flow service grants run-only Access Control List (ACL) for the user on the flow (323). The flow service requests the user to provide credentials (324).

A user can use client invocation process 330 to invoke a workflow. After an author has shared a workflow with a user, the user is notified of an invokable workflow being shared with him or her (e.g., through user interface prompts and/or email). An invocation algorithm can check to see if the user has consented to providing his or her credentials for the workflow to use (331).

Consent status (i.e., user has consented or not consented) can be recorded in an installation status for the workflow. A "NotInstalled" installation status can indicate that the user has not consented to using the workflow or that the author has modified the workflow. The installation status can be recorded per user per workflow. The author and a user can possibly have different installation status on the same workflow.

If the installation status is set to "NotInstalled", the user is shown a connection dialog along with the title and description for any triggers or actions in the workflow definition summary. A client user interface requests the workflow definition and the workflow definition summary from the flow service (332). The client can display information from the workflow definition summary to explain to the user what the workflow does before the user consents to providing credentials (333).

Figure 6:
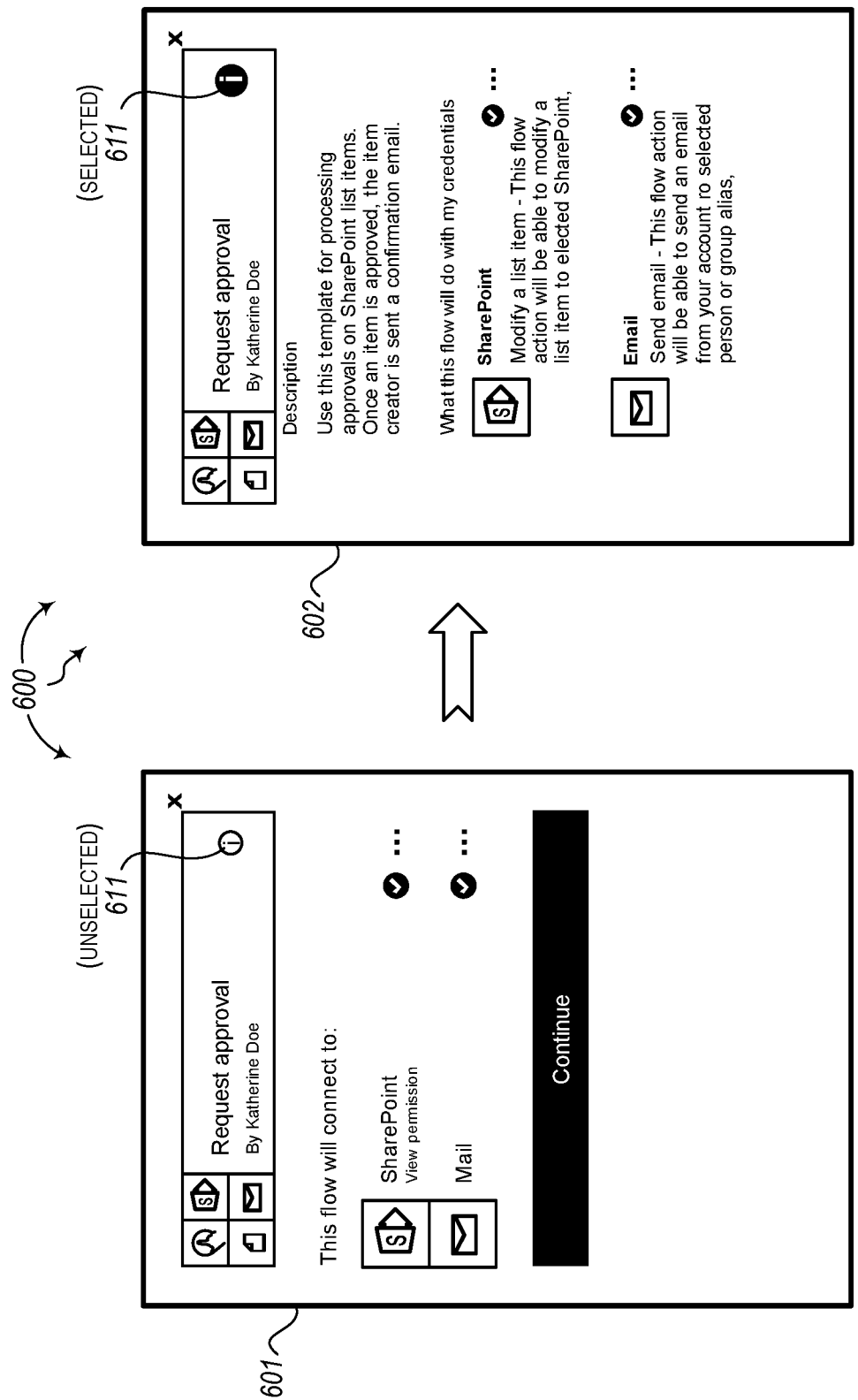
FIG. 6 illustrates a user interface dialog for requesting user consent.

FIG. 6 depicts a user interface dialog 600 for requesting user consent. Dialog box 601 identifies resources for which a workflow intends to access using the user's credentials. In dialog box 601, element 611 is not selected. Using an input device (e.g., a mouse, touch screen, etc.), a user can select element 611. In response to selection of element 611, dialog box 602 can be depicted. Dialog box 602 indicates more precise actions the workflow intends to perform (relative to dialog box 601) on the identified resources using the user's credentials (e.g., modify a list item, send an email, etc.).

After consenting, the user can run the workflow. Consenting sets the installation status to "Installed". When the installation status is set to "Installed" the user is not shown the consent dialog and can proceed to run the flow. As such, once a user has consented for a flow the user can subsequently run the flow without having to (re)consent (cached consent data can be accessed). Author modification of a workflow definition can create a modified (and thus a new) workflow. The user can again be shown the consent dialog for the modified (new) workflow.

Figure 7:
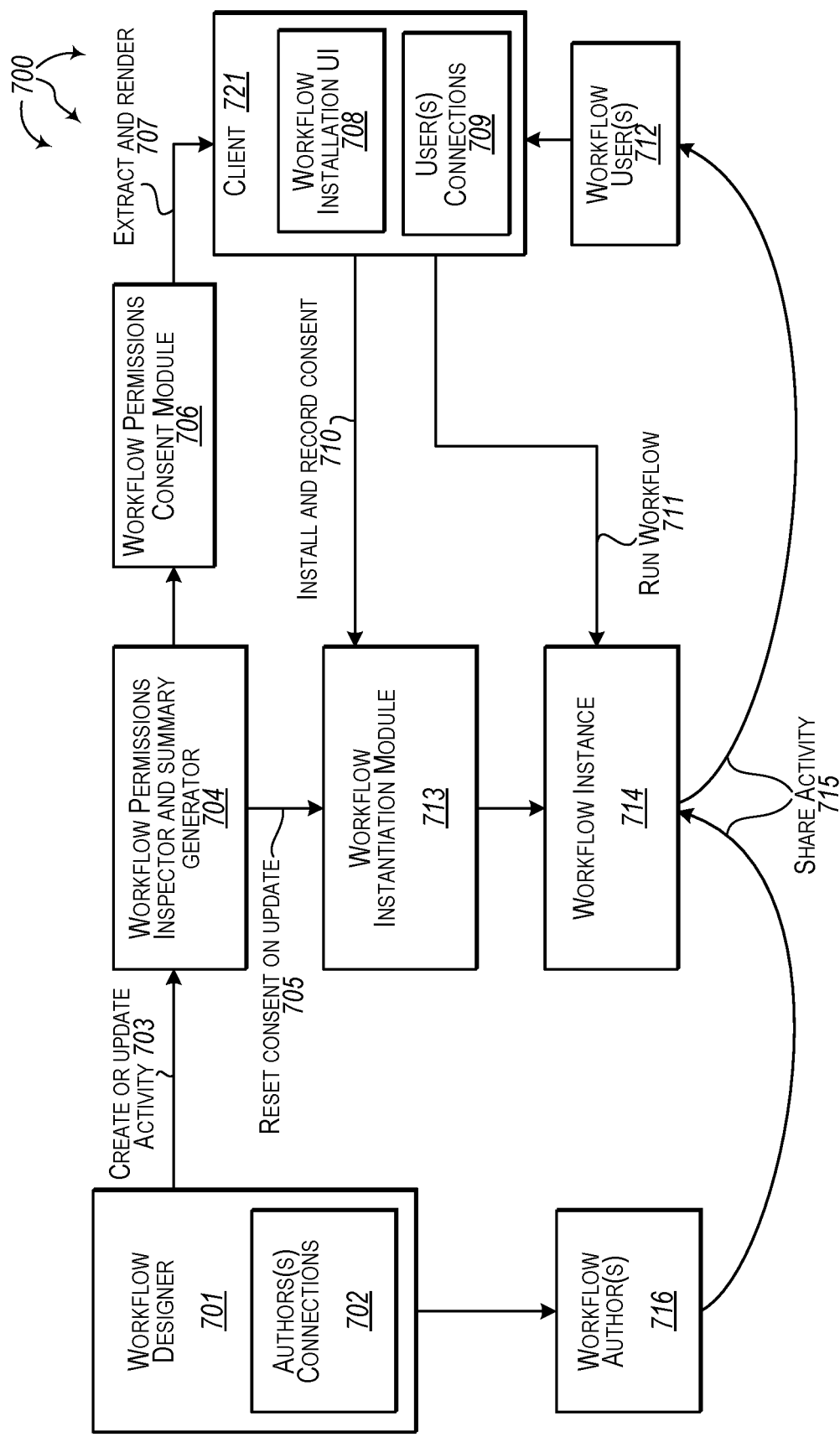
FIG. 7 illustrates a further example data flow for invoking a workflow.

FIG. 7 illustrates a further example data flow 700 for invoking a workflow. Workflow author(s) 716 can use workflow designer 701 and author(s) connections 702 to create or update a workflow definition 703. The created or updated workflow definition 703 can be shared with workflow permissions inspector and summary generator 704. Workflow permissions inspector and summary generator 704 can generate a workflow definition summary. Workflow permissions inspector and summary generator 704 can also determine that a workflow user 712 has not provided consent for the created or updated workflow (e.g., the workflow installation status set to "NotInstalled"). As such, workflow permissions inspector and summary generator 704 resets consent 705 for the workflow at instantiation module 713. (e.g., for a new workflow or an update to a workflow). Workflow permissions inspector and summary generator 704 also sends the workflow summary to workflow permissions consent module 706.

Workflow permissions consent module 706 extracts and renders 707 (from the workflow definition summary) an indication of resources the workflow definition intends to access and actions to be performed on the accessed resource using a workflow user 712's credentials. Client 721 renders 707 workflow installation user interface 708 to a workflow user 712. Workflow installation user interface 708 indicates the resources the workflow definition intends to access using a workflow user 712's credentials. The workflow installation user interface 708 can include a user interface element for depicting more precise information with respect to the actions to be performed on the accessed resources. Selection of the user interface element can cause the more precise information to be rendered to the workflow user 712 at workflow installation user interface 708.

When user consent to use user credentials is provided, the workflow is installed (e.g., the workflow installation status set to "Installed") and consent recorded 710 at workflow instantiation module 713. Workflow instantiation module 713 can then instantiate workflow instance 714 in response to a request from a workflow user 712 to run the workflow 711. Workflow instance 714 can use credentials contained in user(s) connections 709.

Workflow author(s) 716 can share activity 715 with workflow instance 714. Workflow instance 714 can share activity 715 with workflow user(s) 712.

Aspects of the invention have been described with respect to workflows in FIGS. 1-7. These aspects are equally applicable to programs and applications, including declarative applications.

Accordingly, aspects of the invention intelligently, automatically, and authoritatively determine permissions for running a workflow or application and provide more precise information with respect to how permissions are to be used. In one aspect, requested permissions are highly (e.g., up to 100%) aligned with used permissions. That is, permissions in excess of those defined in a workflow are not requested (e.g., "just in case"). Alignment of requested permissions and used permissions mitigates (and potentially eliminates) the possibility of additional unnecessary permissions for malicious purposes.

Since (potentially all) permissions can be known authoritatively and accurately ahead of execution time, permissions can be checked before runtime, thus providing a performance improvement at runtime by front-loading permission checks before execution. Checking permissions before runtime provides a more secure execution environment since a user is apprised of more accurate and detailed permissions information before a workflow or application is run. Checking permissions before runtime also significantly reduces (if not totally eliminates) additional runtime permission checks providing a performance improvement.

The various described components can be included in computer architectures and can be connected to (or be part of) a network, such as, for example, a system bus, a Local Area Network ("LAN"), a Wide Area Network ("WAN"), and even the Internet. Accordingly, the various components as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In some aspects, a computer system comprises one or more hardware processors and system memory. The one or more hardware processors execute instructions stored in the system memory to automatically perform any of the described functionality. In other aspects, computer implemented methods can be used to perform any of the described functionality. In further aspects, computer program products include computer-executable instructions, that when executed at a processor, cause a computer system to perform any of the described functionality.

In one aspect, a computer system includes a processor and system memory coupled to the processor. The system memory stores instructions. The instructions are configured to cause the processor to receive a request to instantiate a workflow. The instructions are configured to cause the processor to access data indicative of user consent allowing workflow use of a user credential based on an association between a machine code generated permission summary and the user credential. The instructions are configured to cause the processor to instantiate the workflow. The instructions are configured to perform a workflow activity defined in the machine code generated permission summary on a user resource using the user credential.

Further instructions are configured to cause the processor to scan a workflow definition and generate the machine code generated permissions summary from content of the workflow definition. Further instructions are configured to cause the processor to present the machine code generated permissions summary at a user interface of a consent module. Further instructions are configured to cause the processor to receive the user consent. Further instructions are configured to cause the processor to cache the user consent.

Computer implemented methods for performing the executed instructions are also contemplated. Computer program products storing the executed instructions, that when executed by a processor, cause a computer system to perform methods are also contemplated.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

In an embodiment, a computer system includes a processor and system memory coupled to the processor. The system memory stores instructions configured to cause the processor to receive a user request to instantiate a workflow. The instructions are further configured to cause the processor to access user consent data indicative of user consent allowing workflow use of a user credential based on an association between a machine code generated permission summary and the user credential. The instructions are further configured to cause the processor to instantiate the workflow. The instructions are further configured to cause the processor to perform a workflow activity defined in the machine code generated permission summary on a user resource using the user credential.

In an embodiment, the instructions configured to instantiate the workflow include instructions configured to instantiate the workflow from a workflow definition.

In an embodiment, the computer system further includes instructions configured to generate the permission summary from the content of the workflow definition.

In an embodiment, the instructions configured to generate the permission summary include instructions configured to generate a permission summary indicating the workflow activity's intended use of the user credential.

In an embodiment, the computer system further includes instructions configured to present the workflow activity's intended use of the user credential at a user interface and receive user consent to the intended use of the user credential at the user interface.

In an embodiment, the computer system further includes instructions configured to associate the machine code generated permission summary with the user credential during installation of the workflow based on the received user consent.

In an embodiment, the computer system further includes instructions configured to cache the user consent data.

In an embodiment, the computer system further includes instructions configured to generate another permission summary from the content of the workflow definition, determine that the permission summary and the other permission summary differ and evict the user consent from cache.

In an embodiment, a method is performed. The method includes receiving a user request to instantiate a workflow. The method includes accessing data indicative of user consent allowing workflow use of a user credential based on an association between a machine code generated permission summary and the user credential. The workflow is instantiated. A workflow activity defined in the machine code generated permission summary is performed on a user resource using the user credential.

In an embodiment, instantiating the workflow includes instantiating the workflow from a workflow definition.

In an embodiment, generating the permission summary from the content of the workflow definition.

In an embodiment, generating the permission summary includes generating a permission summary indicating the workflow activity's intended use of the user credential.

In an embodiment, the workflow activity's intended use of the user credential is presented at a user interface. User consent to the intended use of the user credential is received at the user interface.

In an embodiment, the machine code generated permission summary is associated with the user credential during installation of the workflow based on the received user consent.

In an embodiment, the method includes instructions configured to cache the user consent data.

In an embodiment, another permission summary is generated from the content of the workflow definition. A determination that the permission summary and the other permission summary differ is made. The user consent is evicted from cache.

In an embodiment, a computer program product includes one or more computer storage devices having stored thereon computer-executable instructions that, when executed at a processor, cause a computer system to receive a user request to instantiate a workflow; access user consent data indicative of user consent allowing workflow use of a user credential based on an association between a machine code generated permission summary and the user credential; instantiate the workflow; and perform a workflow activity defined in the machine code generated permission summary on a user resource using the user credential.

In an embodiment, computer-executable instructions that, when executed, cause a computer system to instantiate the workflow include computer-executable instructions that, when executed, cause a computer system to instantiate the workflow from a workflow definition. The computer program product further includes computer-executable instructions that, when executed, cause a computer system to generate the permission summary from the content of the workflow definition.

In an embodiment, computer-executable instructions that, when executed, cause a computer system to generate the permission summary from the content of the workflow definition include computer-executable instructions that, when executed, cause a computer system to generate a permission summary indicating the workflow activity's intended use of the user credential. The computer program product further includes computer-executable instructions that, when executed, cause a computer system to: present the workflow activity's intended use of the user credential at a user interface; and receive user consent to the intended use of the user credential at the user interface.

In an embodiment, the computer program product further includes computer-executable instructions that, when executed, cause a computer system to: cache the user consent data; generate another permission summary from the content of the workflow definition; determine that the permission summary and the other permission summary differ; and evict the user consent from cache.

What is claimed is:
1. A computer system, comprising:
one or more processors;
memory coupled to the one or more processors and storing instructions executable by the one or more processors to cause the one or more processors to:
scan a workflow definition from which a workflow is to be instantiated to automatically identify one or more of triggers or actions that use a user credential to access a user resource;
generate a machine code generated permission summary based on said scanning, the machine code generated permission summary indicating an intended use of the user credential by the workflow; and
provide the machine code generated permission summary to a consent module that is configured to present the intended use of the user credential to a user and to obtain a user consent to the intended use of the user credential therefrom.
2. The computer system of claim 1, wherein the instructions further comprise instructions configured to cause the processor to:
generate a second machine code generated permission summary from the content of the workflow definition;
determine that the machine code generated permission summary and the second machine code generated permission summary differ; and responsive to said determining, provide the second machine code generated permission summary to the consent module.

3. The computer system of claim 2, wherein:
the consent module is further configured to cache the obtained user consent as user consent data; and
the instructions further comprise instructions executable by the one or more processors to cause the one or more processors to, responsive to determining that the machine code generated permission summary and the second machine code generated permission summary differ, evict the user consent data from the cache.

4. The computer system of claim 1, wherein the instructions further comprise instructions executable by the one or more processors to cause the one or more processors to:
determine that the consent module has not obtained the user consent to the intended use of the user credential; and
responsive to determining that the consent module has not obtained the user consent to the intended use of the user credential, reset user consent data.

5. The computer system of claim 1, wherein the instructions executable by the one or more processors to cause the one or more processors to scan the workflow definition comprise instructions executable by the one or more processors to cause the one or more processors to, for each of the one or more triggers or actions:
locate a description file based on a connection name property of the trigger or action; and
identify metadata from the located description file.

6. The computer system of claim 5, wherein the identified metadata for each of the one or more triggers or actions include one or more of:
a connection name associated with a respective trigger or action;
a path associated with the respective trigger or action; or
a method for performing the respective trigger or action.

7. The computer system of claim 5, wherein the instructions executable by the one or more processors to cause the one or more processors to generate the machine code generated permission summary based on said scanning comprise instructions executable by the one or more processors to cause the one or more processors to:
consolidate the identified metadata for each of the one or more triggers or actions to generate consolidated metadata; and
generate the machine code generated permission summary based on the consolidated metadata.

8. The computer system of claim 1, wherein the one or more triggers or actions include one or more of:
a file modification trigger; or
a send email action.

9. A method comprising:
scanning a workflow definition from which a workflow is to be instantiated to automatically identify one or more of triggers or actions that use a user credential to access a user resource;
generating a machine code generated permission summary based on said scanning, the machine code generated permission summary indicating an intended use of the user credential by the workflow; and
providing the machine code generated permission summary to a consent module that is configured to present the intended use of the user credential to a user and to obtain a user consent to the intended use of the user credential therefrom.

10. The method of claim 9, further comprising:
generating a second machine code generated permission summary from the content of the workflow definition;
determining that the machine code generated permission summary and the second machine code generated permission summary differ; and
responsive to said determining, providing the second machine code generated permission summary to the consent module.

11. The method of claim 10, wherein:
the consent module is further configured to cache the obtained user consent as user consent data; and
the method further comprises, responsive to determining that the machine code generated permission summary and the second machine code generated permission summary differ, evicting the user consent data from the cache.

12. The method of claim 9, further comprising:
determining that the consent module has not obtained the user consent to the intended use of the user credential; and
responsive to said determining that the consent module has not obtained the user consent to the intended use of the user credential, resetting user consent data.

13. The method of claim 9, wherein said scanning the workflow definition comprises, for each of the one or more triggers or actions:
locating a description file based on a connection name property of the trigger or action; and
identifying metadata from the located description file.

14. The method of claim 13, wherein the identified metadata for each of the one or more triggers or actions include one or more of:
a connection name associated with a respective trigger or action;
a path associated with the respective trigger or action; or
a method for performing the respective trigger or action.

15. The method of claim 13, wherein said generating the machine code generated permission summary based on said scanning comprises:
consolidating the identified metadata for each of the one or more triggers or actions to generate consolidated metadata; and
generating the machine code generated permission summary based on the consolidated metadata.

16. The method of claim 14, wherein the one or more triggers or actions include one or more of:
a file modification trigger; or
a send email action.

17. A computer program product comprising one or more computer storage devices having stored thereon computer-executable instructions that, when executed at one or more processors, cause a computer system to perform operations, the operations comprising:
scanning a workflow definition from which a workflow is to be instantiated to automatically identify one or more of triggers or actions that use a user credential to access a user resource;
generating a machine code generated permission summary based on said scanning, the machine code generated permission summary indicating an intended use of the user credential by the workflow; and
providing the machine code generated permission summary to a consent module that is configured to present the intended use of the user credential to a user and to obtain a user consent to the intended use of the user credential therefrom.

18. The computer program product of claim 17, wherein the operations further comprise:
- generating a second machine code generated permission summary from the content of the workflow definition;
- determining that the machine code generated permission summary and the second machine code generated permission summary differ; and
- responsive to said determining, providing the second machine code generated permission summary to the consent module.

19. The computer program product of claim 17, wherein the operations further comprise:
- determining that the consent module has not obtained the user consent to the intended use of the user credential; and
- responsive to said determining that the consent module has not obtained the user consent to the intended use of the user credential, resetting user consent data.

20. The computer program product of claim 17, wherein said scanning the workflow definition comprises, for each of the one or more triggers or actions:
- locating a description file based on a connection name property of the trigger or action; and
- identifying metadata from the located description file.

\* \* \* \* \*